US008230075B1

(12) United States Patent
Weskamp et al.

(10) Patent No.: US 8,230,075 B1
(45) Date of Patent: Jul. 24, 2012

(54) METHOD AND DEVICE FOR IDENTIFYING DEVICES WHICH CAN BE TARGETED FOR THE PURPOSE OF ESTABLISHING A COMMUNICATION SESSION

(75) Inventors: Marcos Weskamp, San Francisco, CA (US); Gever Tulley, Montara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 745 days.

(21) Appl. No.: 12/271,865

(22) Filed: Nov. 15, 2008

(51) Int. Cl.
*G06F 15/16* (2006.01)
(52) U.S. Cl. ........ 709/227; 709/203; 709/204; 715/737; 715/740
(58) Field of Classification Search .................. 709/203, 709/204, 227; 715/737, 740, 741
See application file for complete search history.

(56) References Cited

U.S. PATENT DOCUMENTS

| 7,996,514 B2* | 8/2011 | Baumert et al. ............... 709/224 |
| 2003/0142016 A1* | 7/2003 | Pickup .......................... 342/387 |
| 2007/0224937 A1* | 9/2007 | Jung et al. .................... 455/41.2 |

* cited by examiner

*Primary Examiner* — David Lazaro
(74) *Attorney, Agent, or Firm* — Schwegman, Lundberg & Woessner, P.A.

(57) ABSTRACT

Computer-based methods and devices for identifying devices and objects that can be targeted for the purpose of establishing a communication session are described. In an example embodiment, a mobile handset displays a visual indication of the location of devices in proximity relative to the location and orientation of the mobile handset. A mobile handset includes object recognition logic for determining when the mobile handset is targeting another device with which the mobile handset is authorized to communicate. In some cases, the targeted device may be a non-computing object serving as a proxy for another computing device.

9 Claims, 11 Drawing Sheets

METHOD AND DEVICE FOR IDENTIFYING DEVICES WHICH CAN BE TARGETED FOR THE PURPOSE OF ESTABLISHING A COMMUNICATION SESSION

TECHNICAL FIELD

The present disclosure generally relates to establishing a communication session between computing devices. Some example embodiments of the present disclosure relate to methods and computing devices for identifying devices that can be targeted with a mobile device, and targeting, with the mobile device, another computing device for the purpose of initiating a communication session between the two devices.

BACKGROUND

It is not uncommon for modern homes and offices to have several sophisticated computing devices with advanced processing, networking, and display capabilities. For example, digital cameras are able to send digital photos, and digital picture frames are able to receive digital photos, via wireless networks. Flat panel television displays are designed with built-in processors and networking devices for receiving, processing and displaying content from other network-enabled devices. Mobile handsets, which have traditionally been used primarily for making telephone calls, now include powerful processors, touch screen displays, location and image sensors and advanced networking capabilities for executing a variety of software applications. Many of these computing devices require significant technical knowledge and effort to configure and operate for effective use. Unfortunately, as the functionality of these computing devices increases, so too will their overall complexity.

In an environment with many network-capable devices, configuring two devices to communicate with one another, and then actually establishing a communication session can be a difficult task. In some cases, it may be difficult to even identify devices in an environment that are capable of establishing communication sessions. When a device capable of a communication session is identified, it can still be difficult to actually establish the communication session. Furthermore, because so many advanced computing devices are mobile, a device that is present in an environment at one moment may not be present at a different time. Accordingly, it may be difficult to establish a communication session with that device when it is not local.

SUMMARY

Computer or processor-based methods and systems for identifying devices that can be targeted by a mobile device are disclosed. In an example embodiment, a mobile handset receives location information for devices within proximity of the mobile handset. The mobile handset analyzes location and orientation information for the mobile handset, and then presents a visual indication of the relative location of other devices, based on the location and orientation of the mobile device. Other information may be received and displayed by the mobile handset, to include authorization information specifying the authority that the mobile handset, or user, has to establish a communication session with a particular device or devices. Additionally, the functional capabilities of one or more devices may also be visually conveyed by the mobile handset.

In other example embodiments, the mobile handset includes an image sensor and object recognition logic for determining when the mobile handset is targeting another object or device. For instance, images captured by the mobile handset are analyzed, and when a known object is identified, the handset determines that it is targeting the known object. In some embodiments, the object might be a non-computing object that is serving as a proxy for a computing device.

Other aspects of the invention will become apparent from the detailed description that follows.

DESCRIPTION OF THE DRAWINGS

Some embodiments are illustrated by way of example and not limitation in the figures of the accompanying drawings, in which.

DETAILED DESCRIPTION

Figure 1:
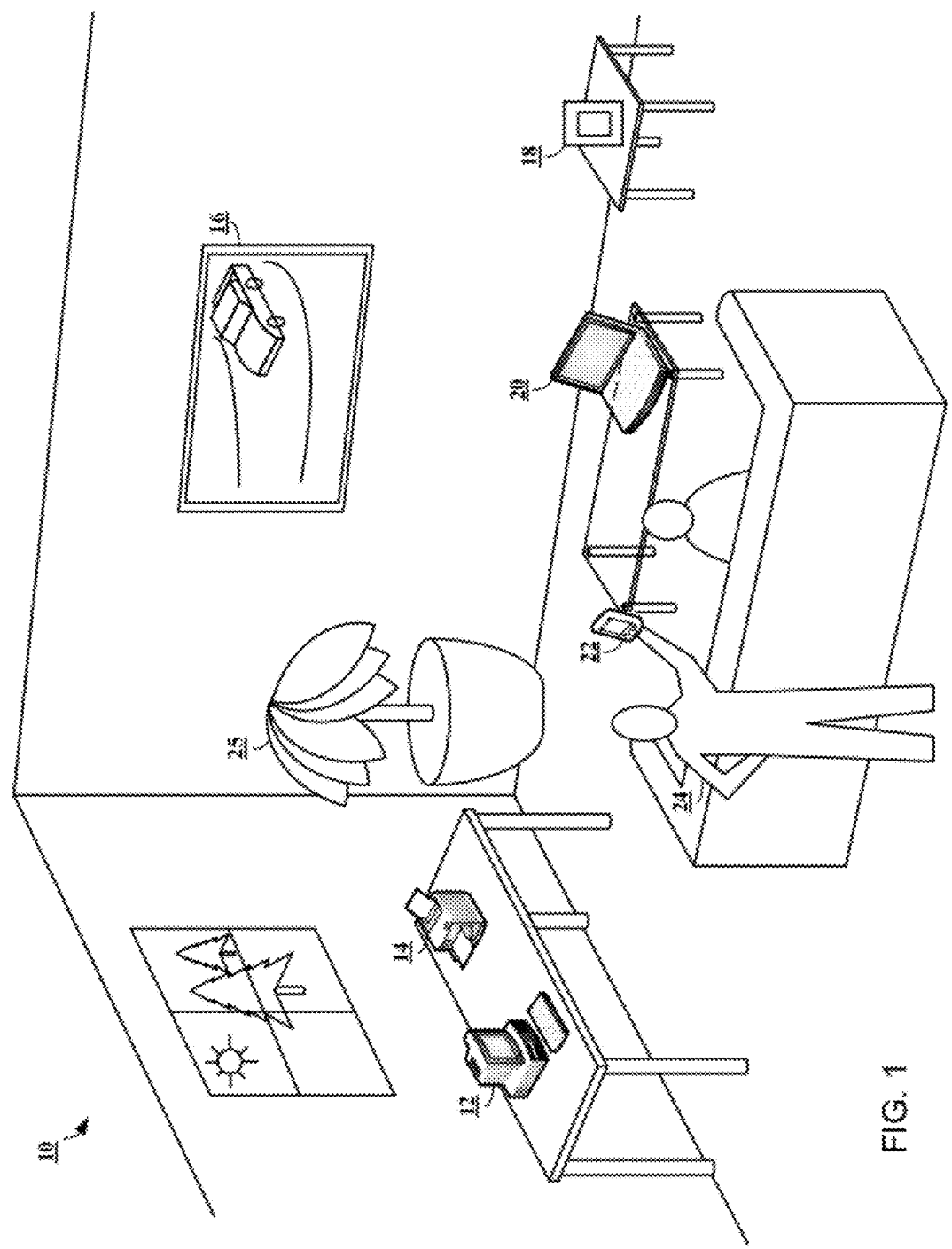
FIG. 1 illustrates a real-world, physical environment including several network-enabled devices that may target, or be targeted, for the purpose of establishing a communication session, according to an embodiment of the invention.

Computer-based methods and devices for identifying computing devices that can be targeted for the purposes of establishing a communication session are disclosed. In the following description, for purposes of explanation, numerous specific details are set forth in order to provide a thorough understanding of example embodiments. It will be evident, however, to one skilled in the art that the present invention may be practiced without these specific details.

Consistent with some example embodiments, a mobile computing device—or simply "mobile device"—includes real-time targeting logic for determining the location of devices and objects in a particular environment with respect to the current location of the mobile device. The real-time targeting logic includes location logic and orientation logic for analyzing orientation information for the mobile device, and location information for the mobile device and location information for other computing devices within a determinable proximity of the mobile device. Based on the location information for the mobile device and the location information for other computing devices in the environment, and a current orientation of the mobile device, a user interface module of the mobile device presents a visual indication of the location of computing devices in the environment with respect to the location of the mobile device.

In some embodiments, the mobile device includes an image sensor (e.g., camera) and object recognition logic for analyzing images captured with the image sensor. The object recognition logic compares images captured with the image sensor with object recognition information for devices within close proximity of the mobile device to determine when the mobile device is targeting another device. When the mobile device is targeting another device, a communication session might be established to transfer data, such as a file, from the mobile device to the targeted device, or, from a server or other computing device to the targeted device. For example, after targeting a computing device with a mobile device, the mobile device may detect an input or signal resulting from a user interaction with the mobile device (e.g., some user input or sequence of inputs). Based on the detected input or interaction, the mobile device may communicate a reference to some electronically stored data (e.g. a file) to the targeted device along with a directive (e.g., command or instruction or request) directing the targeted device to retrieve the electronically stored data. In some embodiments, the mobile device may communicate the directive to a server, directing the server to initiate the transfer of the electronically stored data to the targeted device.

In some embodiments, the real-time targeting logic determines when the mobile device is targeting an object representing a proxy for another computing device. When the mobile device is targeting the proxy object, a user of the mobile device can initiate a communication session of some type with the computing device represented by the proxy object. For example, a user may specify that a plant is to serve as a proxy for another person's mobile handset. By targeting the plant with his or her mobile device, the user can initiate a communication session with the other person's mobile handset.

FIG. 1 illustrates a real-world, physical environment including several network-enabled devices that may be targeted for the purpose of establishing a communication session of some type, according to an embodiment of the invention. The physical environment of FIG. 1 is a room 10 in which there is a desktop computer 12 and printer 14 atop a desk, a flat-panel display 16 mounted on the wall, a digital picture frame 18 atop a side table, a laptop computer 20 atop a coffee table, and a mobile handset 22 in the hand of a person 24. In this example environment, the personal computer 12, flat-panel display 16, digital picture frame 18, laptop computer 20, and mobile handset 22 represent computing devices that may be targeted by a mobile device for the purpose of establishing a communication session. As the laptop computer 20 and mobile handset 22 are mobile devices, these devices additionally represent devices that may be used to target other computing devices for the purpose of establishing a communication session. At least some of the computing devices illustrated in FIG. 1 are network-enabled devices having the ability to communicate information (e.g., electronically stored data) with other computer devices via one or more wired or wireless networking technologies.

As used herein, the term "targeting" means to position a mobile device, both in terms of its location and orientation, so as to physically aim or point the mobile device at another object or device. The particular mechanism by which a mobile device determines that it is targeting another device may vary. For instance, in some embodiments, the mobile device includes one or more sensors for determining the mobile device's location and orientation. With location logic and orientation logic for analyzing the mobile device's orientation at a particular moment in time when the mobile device's location relative to another device is known, the mobile device can determine whether it is pointing in the direction of the other device. In some embodiments, the mobile device includes an image sensor and object recognition logic. In such an embodiment, the mobile device determines it is targeting another device when object recognition information for the other device is detected in an image captured by the mobile device.

When using a mobile device with location and orientation sensors to target another device, the particular orientation that a device must have relative to the location of the targeted device may vary in different embodiments. For example, in some embodiments, a mobile device is held generally horizontal, or parallel to the ground, when attempting to target another device or object. Alternatively, in some embodiments, a mobile device is held generally vertical, or perpendicular to the ground, in order to target another device. In some embodiments, the particular orientation of the mobile device required to target another device or object is a configurable option, such that the mobile device can be configured to target other devices in an orientation that is generally horizontal, or alternatively, generally vertical, or in some other predetermined orientation.

In those embodiments that utilize object recognition technology to determine if the mobile device is targeting another device, targeting is dependent upon pointing or aiming the image sensor of the mobile device in the direction of the device to be targeted. For example, in some embodiments, a mobile device includes an image sensor (e.g., camera) and real-time targeting logic with object recognition logic. Images captured by the image sensor are analyzed by the real-time targeting logic by comparing the captured images with object recognition information for various devices or objects within the environment. A mobile device determines that it is targeting another device when the mobile device recognizes an image of a known object or device (e.g., a flat panel display, a desktop computer, or other device or object) based on the known object's or device's object recognition information.

Before another device can be targeted by the mobile device, the mobile device must have or obtain location information or object recognition information for the device to be targeted. In some cases, the mobile device may have previously obtained the location information or object recognition information for one or more devices. In such a scenario, the location information or object recognition information for a device to be targeted in a particular environment may be recalled or read from the mobile device's memory when the mobile device determines that the mobile device is in the general proximity of the device to be targeted.

In some cases, a user may enter a new environment in which there are devices that can be targeted by a mobile device. There are several ways that a mobile device may obtain location information or object recognition information for objects and devices in a new environment. In some embodiments, sensors in the environment detect the presence of the mobile device and automatically initiate a transfer of location information or object recognition information for devices in the environment to the mobile device. For example, the mobile device may include a radio frequency identification (RFID) tag or device, which is read by an RFID reader located in the environment. The RFID reader then reports the presence of the mobile device to a server, or some other computing device, which in turn establishes a communication session with the mobile device and communicates location information or object recognition information for devices in the environment to the mobile device. Alternatively, in some embodiments, the mobile device, upon entering a new environment, requests location information or object recognition information for devices in the environment from a server or other computing device. In some embodiments, to obtain the location information or object recognition information for devices in the new environment, the mobile device communicates location information for the mobile device to a remote server, and the remote server responds with location information or object recognition information for the various devices in the environment. For instance, based on the location of the mobile device, the remote server may communicate an environment model to the mobile device for the environment or location of the mobile device. The environment model may include location information or object recognition information for devices that can be targeted by the mobile device. In addition, the environment model may include authorization information for the mobile device, or the user of the mobile device. This authorization information establishes or provides a user's authority to establish a communication session (e.g., a content mirroring session or control interface session, or some other type of communication session) with various devices in the environment.

Referring again to FIG. 1, before a user physically manipulates a mobile device to target another device, the user may desire to see a physical representation of the locations of the devices in the environment that can be targeted. When the mobile device has the location information for devices in the environment, the location and orientation logic of the mobile device can determine, based on the current location and orientation of the mobile device, the location of devices in the environment relative to the mobile device. This information can be utilized to present a visual representation or map of the locations of the devices in the environment that can be targeted, relative to the location and orientation of the mobile device 22. As the location and orientation of the mobile device 22 changes, the mobile device 22 updates the visual representation of the locations of other devices in real time.

Using a user interface or map that depicts the visual representation of the locations of the devices in the environment, the person 24 with the mobile handset in his hand can determine the location and target any of the computing devices in the room by viewing the display 23 of the mobile handset 22 and simply pointing the mobile handset 22 at a particular computing device.

Figure 2:
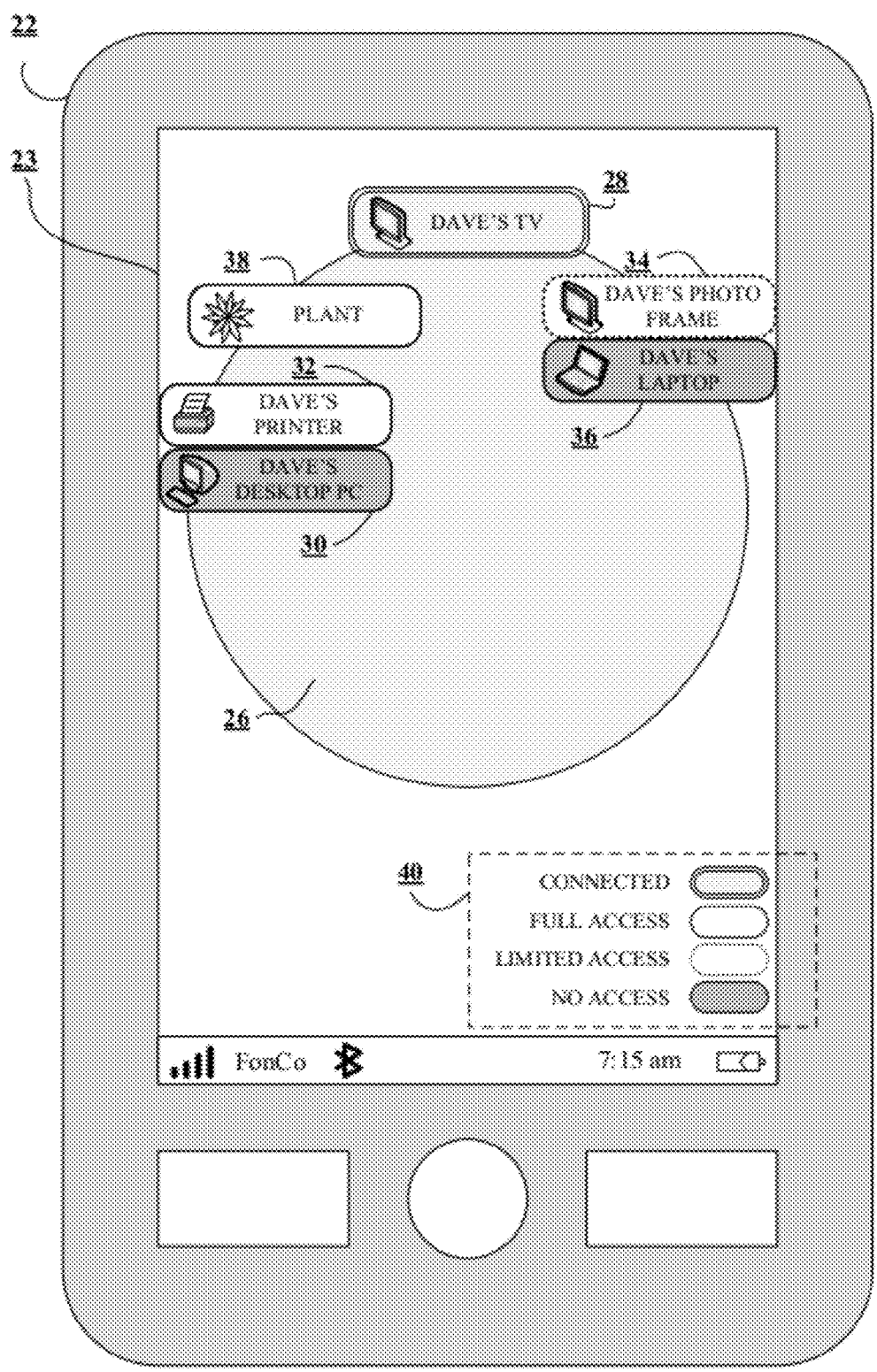
FIG. 2 illustrates an example of a mobile computing device, and corresponding user interface, for use in presenting the relative location of devices, with respect to the mobile device, according to an embodiment of the invention.

FIG. 2 illustrates an example of a mobile computing device, and corresponding user interface, for use in presenting the relative location of devices, with respect to the mobile device, according to an embodiment of the invention. The mobile handset 22 shown in FIG. 2 has a display 23 that is presenting a graphical user interface that indicates the locations of computing devices and objects in an environment, relative to the mobile handset 22. The mobile handset 22 is displaying a circle 26 representing three-hundred-sixty degrees of two dimensional space around the current location of the mobile handset 22. Accordingly, the mobile handset 22, if it was to appear in the user interface of the handset's display, would be located at the center of the circle. In this example, the mobile handset 22 is assumed to be in the location, relative to other devices, as indicated in FIG. 1—for example, in a person's 24 hand behind the sofa and generally aimed at, or pointing in the direction of, the flat panel display 16 on the wall. Accordingly, the top of the circle 26, where the user interface element 28 with text "DAVE'S TV" appears, represents the physical space in the direction that the mobile device 22 is pointing. So, in this example, the user interface element 28 at the top of the circle 26 indicates that the mobile handset is currently aimed at, or pointed in the direction of, the flat panel display 16 (FIG. 1), which is identified by the name, "DAVE'S TV." By pointing the handset in the direction of the flat panel display 16, the person 24 can determine from the user interface presented by the mobile handset 22 that the flat panel display 16 has the name "DAVE'S TV" and that the person or mobile handset has been granted the authority to interact in some manner with the flat panel display.

As indicated by the user interface shown on the display 23 of the mobile handset 22, the personal computer 12 and printer 14 are generally located to the left of the mobile handset 22, as indicated by the user interface elements 30 and 32 with text "DAVE'S DESKTOP PC" and "DAVE'S PRINTER" respectively. Similarly, user interface elements 34 and 36 indicate that the laptop 20 and digital photo frame 18 are located at a positive forty-five degree angle, as measured from an imaginary axis represented by a line extending in the direction in which the mobile handset 22 is pointing. In addition, user interface element 38 indicates the location of the plant 25 relative to the location of the mobile device. As described in greater detail below, the plant serves as a proxy for another computing device.

In some embodiments, the user interface of the mobile device 22 provides a visual indication of additional information for the devices, beyond each device's location relative to the mobile handset 22. In some embodiments, the user interface element representing each device in the environment may indicate a device's capabilities, for example, functions the device is capable of performing. In some embodiments, authorization information for each device is presented. For example, the user interface may convey one or more access rights that the mobile device, or a user of the mobile device, has with respect to one or more of the devices whose locations are being presented. In some embodiments, the type of interaction that the mobile device, or a user of the mobile device, has been authorized to establish may be conveyed by the user interface. For instance, if a user has been authorized to establish a communication session with an application executing at another device, the user interface element or icon representing that other device may indicate that a communication session can be established with that device.

In some embodiments, the level of access or authority that a mobile device or user has with respect to another device may be conveyed. For instance, as the legend 40 in FIG. 2 indicates, the format of the user interface elements 28, 30, 32, 34, 36 and 38 indicates a level of authority the mobile device has for each device presented. Specifically, the user interface element 28 with text "DAVE'S TV" indicates that the mobile device is currently connected to a device by the same name, in this case, the flat panel display 16. In this example, the mobile handset has no authorization (e.g., "NO ACCESS") to communicate or connect with the desktop computer 12 (e.g. "DAVE'S DESKTOP" 30) or the laptop computer 20 (e.g., "DAVE'S LAPTOP" 36). The mobile device has full access to the printer and limited access to the digital photo frame. If the authorization information indicates that the person 24 has been granted the authority to interact with another device, when the person 24 aims the mobile handset to target a device with which the person 24 has been authorized to interact, the mobile handset 22 will display a visual indicator that indicates the mobile handset 22 is targeting a particular device, and the user has been authorized to establish an interactive session of some type with the targeted device.

FIGS. 3 through 6 illustrate an example of a mobile computing device 42 for use in targeting another device 16, for the purpose of establishing a communication session with the targeted device, according to an embodiment of the invention. Each of FIGS. 3 through 6 illustrates a mobile handset 42 (e.g., mobile phone, personal digital assistant, personal media player, or similar device) with an image sensor at a particular point in time, being in a particular location and having a particular orientation with respect to a flat-panel display 16. FIGS. 3 through 6 illustrate an example of how, in one embodiment, the mobile handset 42 responds as the location and orientation of the mobile handset 42 changes and causes the mobile handset's image sensor to capture new images. In particular, the figures illustrate an example of how a graphical user interface is presented on the mobile handset 42 as the mobile handset 42 is physically manipulated by a person 24 to target a flat-panel display 16 with which the mobile handset 42 has been authorized to interact. The mobile handset 42 illustrated in FIGS. 3 through 6 has a touch screen display 44 for presenting a graphical user interface and detecting input (e.g., user input). It will be appreciated by those skilled in the art that in various embodiments, input may be received or detected via a finger or stylus interacting with a touch screen display, buttons, touch pads, joysticks, thumb scrolls, or other input devices or mechanisms.

Figure 3:
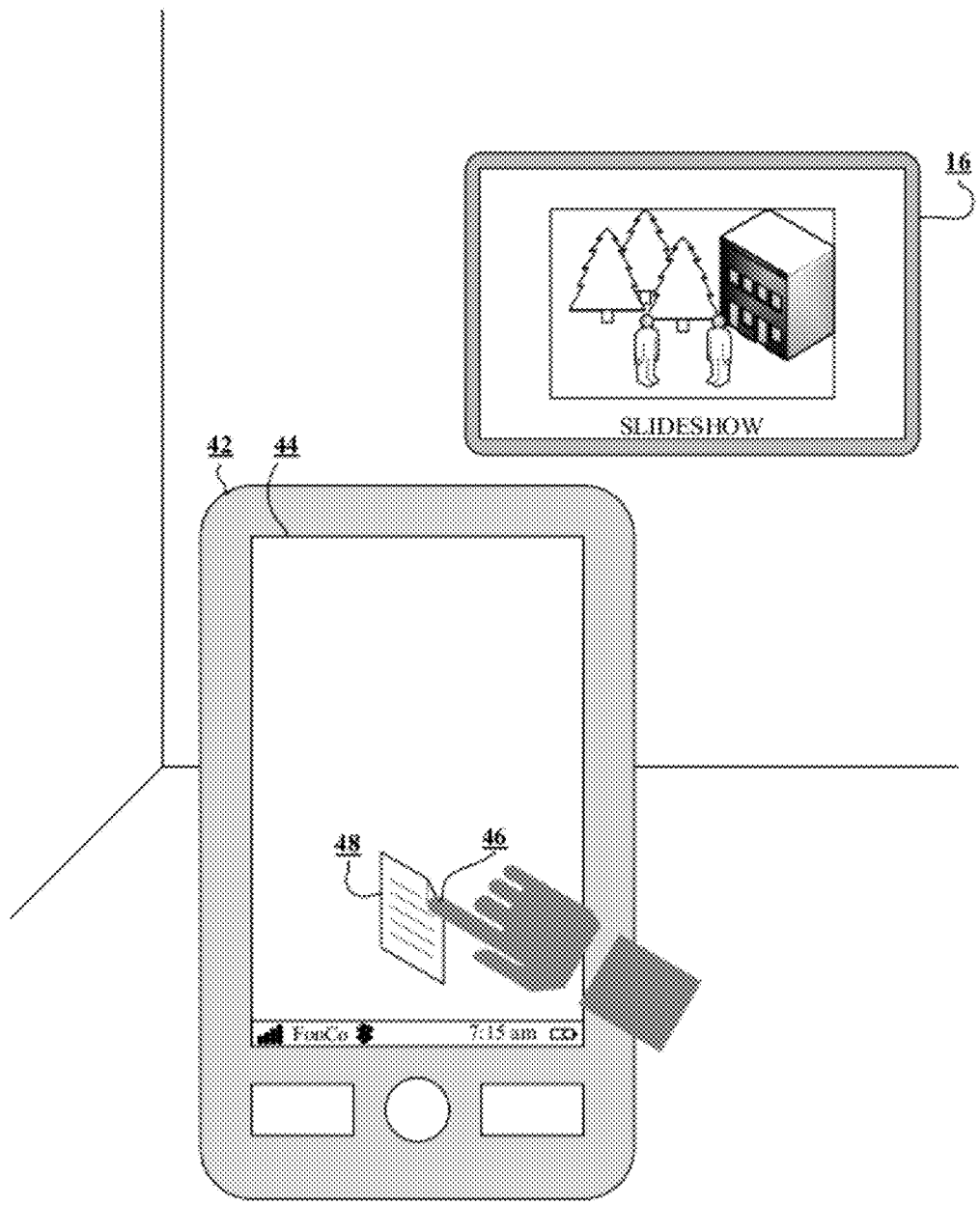
FIGS. 3 through 6 illustrate an example of a mobile computing device for use in targeting a another device, for the purpose of establishing a communication session with the targeted device, according to an embodiment of the invention.

In FIG. 3, a user has selected a file that the user desires to transfer to the flat-panel display 16 on the wall. In this example, the file represents a digital photograph that the user would like displayed in a slideshow application that is executing, at least in part, at the flat panel display 16. The selection of the file is made by pressing a finger 46 on the user interface element 48, which in this example is a graphical icon that represents the file. In some embodiments, a user interface element presented on the mobile device's display 44 represents a file stored at the mobile handset 42. Alternatively, a user interface element may represent a file that is stored at a remote device, such as a server or some other computing device. Furthermore, the exact look and location of the user interface elements presented on the display can vary greatly from one implementation to the next. Those skilled in the art of user interface design will appreciate that any number and variety of user interface elements might be used to represent electronically stored information, such as a file.

Figure 4:
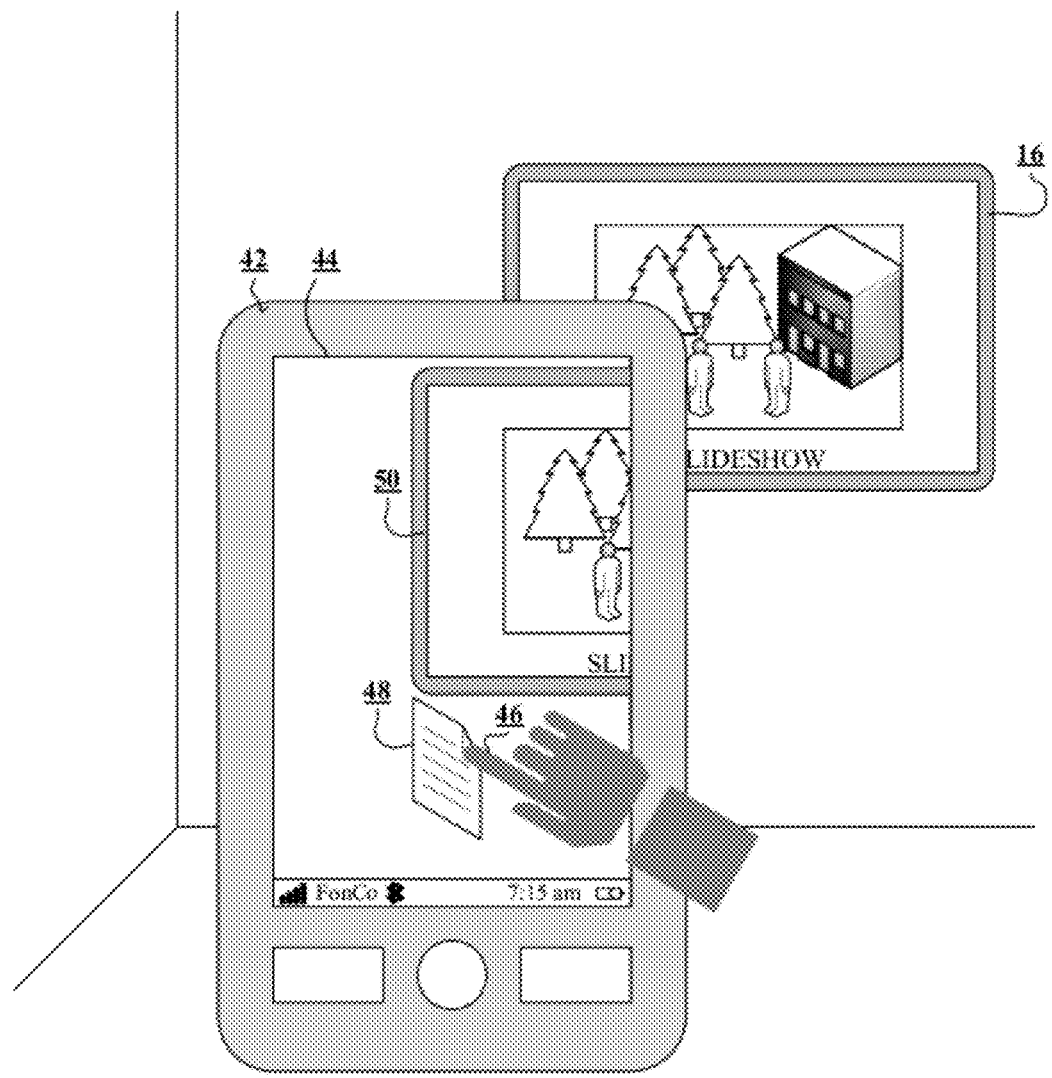

In FIG. 4, as the user moves the mobile handset 42 in an effort to target the flat-panel display 16, the user is continuing to press his or her finger 46 on the user interface element 48 representing the digital photograph file. In this example, targeting is achieved by pointing the mobile handset's image sensor in the direction of the flat-panel display 16, such that the image sensor captures images of the flat-panel display 16. As illustrated in FIG. 4, the display 44 of the mobile handset 42 is presenting or displaying images captured by the mobile handset's image sensor. Accordingly, as shown in FIG. 4 the mobile handset is currently aimed at, or pointed in the direction, of the left portion of the flat-panel display 16. As such, an image 50 of the left portion of the flat-panel display is depicted on the display 44 of the mobile handset 42.

Figure 5:
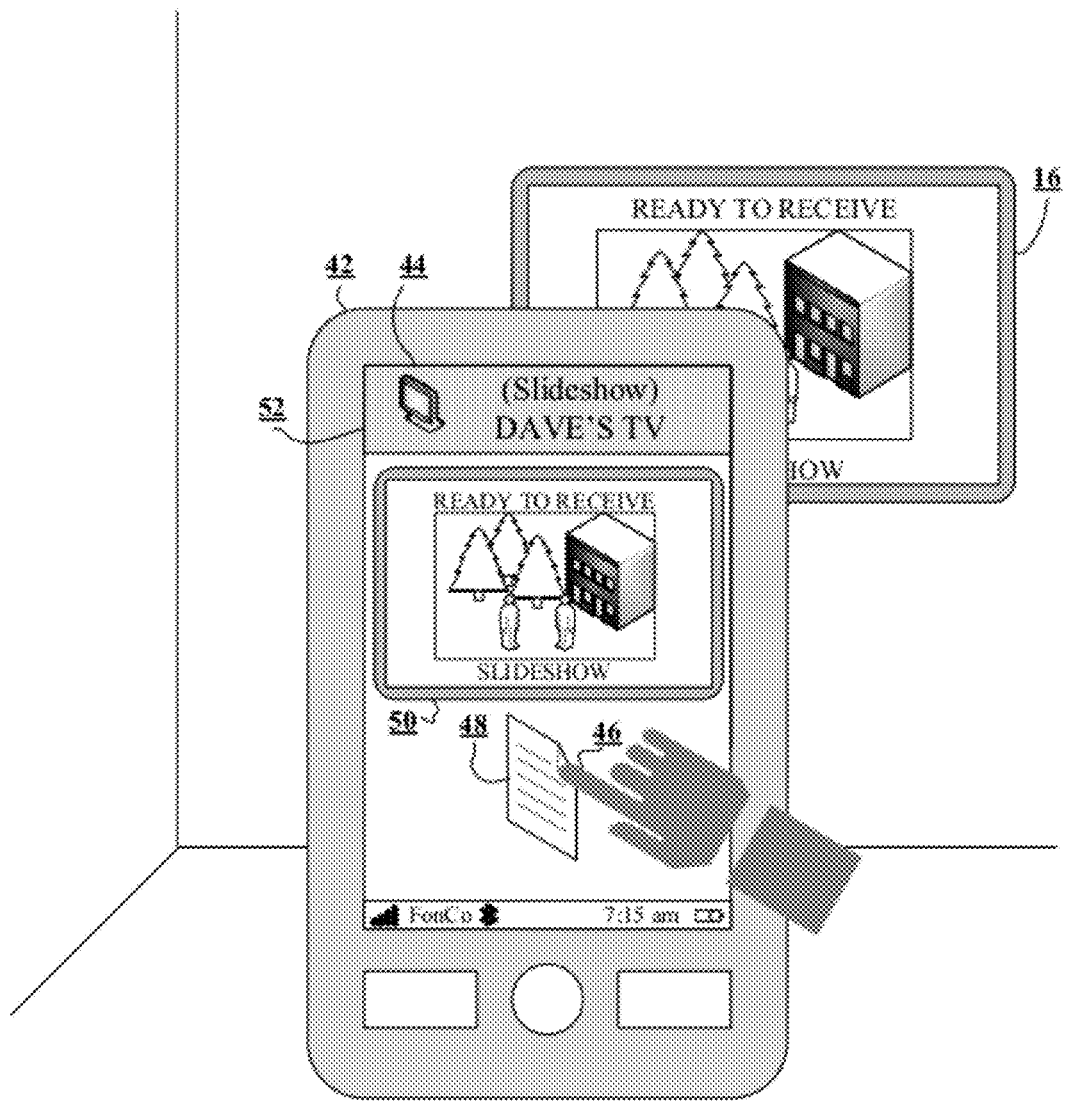
Figure 6:
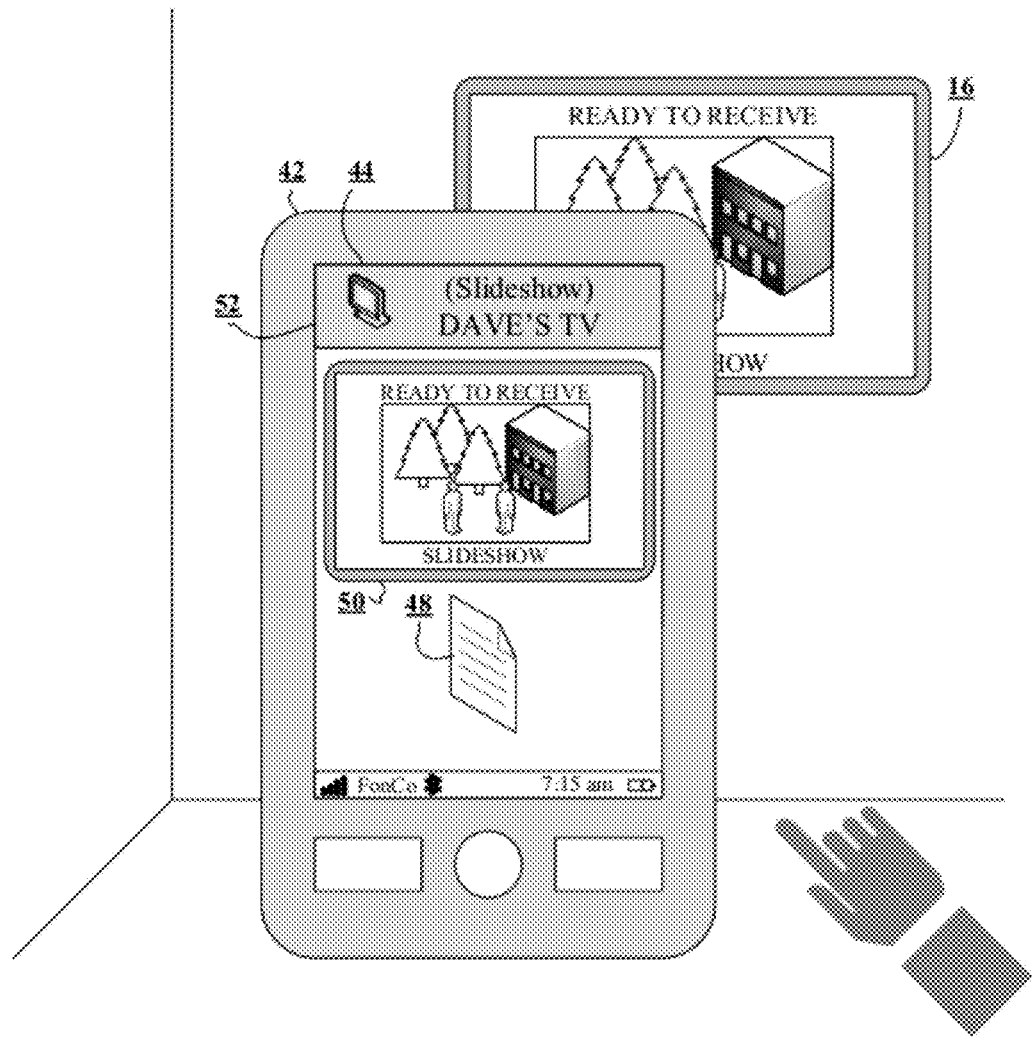

In FIG. 5, the user continues to press on the user interface element 48 representing the digital photograph file. As the user continues to move the mobile handset to target the flat panel display, the object recognition logic of the handset's real-time targeting logic processes images captured from the image sensor in real-time. Once the object recognition logic identifies an image of the flat panel display 16, the mobile handset determines that it is targeting the flat panel display 16. Accordingly, the mobile handset 42 presents or displays a user interface element 52 to indicate that the mobile handset is currently targeting the flat panel display, and that the mobile handset is authorized to transfer the digital photograph file to the flat panel display 16. In this example, the user interface element has the text "DAVE'S TV" to indicate that the mobile handset is targeting the flat panel display and the text "slideshow" to indicate the nature of the file transfer.

In this example, the mobile handset 42 determines that it is targeting the flat-panel display 16 by comparing images captured with the mobile handset's image sensor with previously captured images or object recognition information, for the flat-panel display 16. As shown in FIG. 5, the user interface elements 52 provide a visual indication that the mobile handset is currently targeting the flat-panel display 16. In addition, a user interface element may indicate that the mobile handset, or a user of the mobile handset, has authority to initiate a communication session of some type with the flat panel display. For instance, in some embodiments, the communication session may be a file or data transfer. In this example, a user has been authorized to add a digital photograph to a slideshow application executing at the flat-panel display.

To initiate the file transfer, the user lifts his finger from the user interface element 48 representing the digital photograph file. By lifting his or her finger from the user interface element, the user initiates the transfer of the digital photograph file to the flat-panel display 16. In some embodiments, the mobile handset 42 communicates a directive (e.g., command, request or instruction) along with a reference to the file, from the mobile handset 42 to the flat-panel display 16. When received, the flat panel display 16 processes the directive and uses the reference to request the file from a server or other computing device. In some embodiments, the mobile handset 42 communicates a reference to the file to a server along with a directive, directing the server to communicate the file to the flat-panel display 16. In other embodiments, the file may be communicated directly from the mobile handset 42 to the flat-panel display 16.

Figure 7:
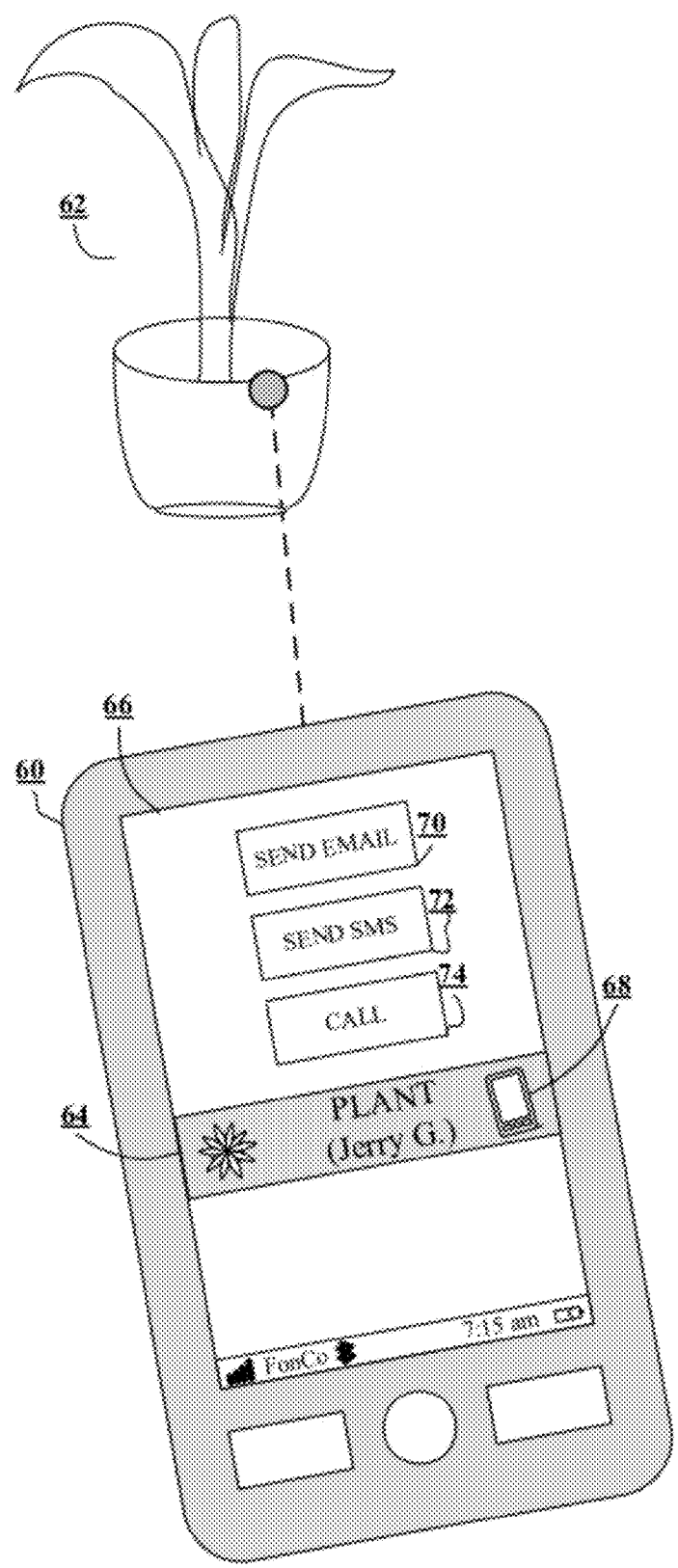
FIG. 7 illustrates an example of a mobile computing device for use in targeting a non-computing object serving as a proxy for a computing device, according to an embodiment of the invention.

FIG. 7 illustrates an example of a mobile computing device for use in targeting a non-computing object serving as a proxy for a computing device, according to an embodiment of the invention. As illustrated in FIG. 7, a mobile handset 60 is pointing in the direction of a plant 62. In this example, a user has previously associated the plant 62 with a computing device. Specifically, in this example, the user has previously associated the plant 62 with a mobile phone belonging to someone with the name "Jerry G." as indicated by the user interface element with reference number 64 on the mobile handset's display 66. The user interface element 64 indicates that the mobile handset is targeting the plant, and in this case, that the plant represents Jerry G.'s phone 68. Accordingly, several additional user interface elements 70, 72 and 74 are displayed on the mobile handset's display 66 and allow or enable the user to communicate with Jerry G.'s phone by targeting the plant.

To utilize an object as a proxy for another computing device, the mobile handset must be trained first to recognize that it is targeting the object, and additionally that the object is serving as a proxy for a particular computing device. The method of training the mobile handset to recognize when it is targeting the object depends on what type of targeting is to occur. For example, if the mobile handset is going to use location and orientation information to determine the handset's location and orientation relative to the location of the object, then training may be achieved with a triangulation algorithm. For example, a user may point the mobile handset at the plant, and then provide some input to establish a first location and orientation for which the mobile handset is targeting the plant. Next, the user might move to a new location and again point the mobile handset at the plant and provide some input to indicate that the handset is targeting the plant. With two known locations and orientations for which the mobile handset is targeting the plant, the mobile handset can use triangulation to determine other locations and orientations for which the mobile handset will be targeting the plant.

If object recognition logic is to be used for targeting the object, then a user can capture one or more images of the object (e.g., the plant) and establish object recognition information for the plant. When the mobile handset's object recognition logic later analyzes an image captured from the image sensor, and recognizes the object in the image, the mobile handset determines that is pointing in the direction of the object, and thus targeting the object.

Figure 8:
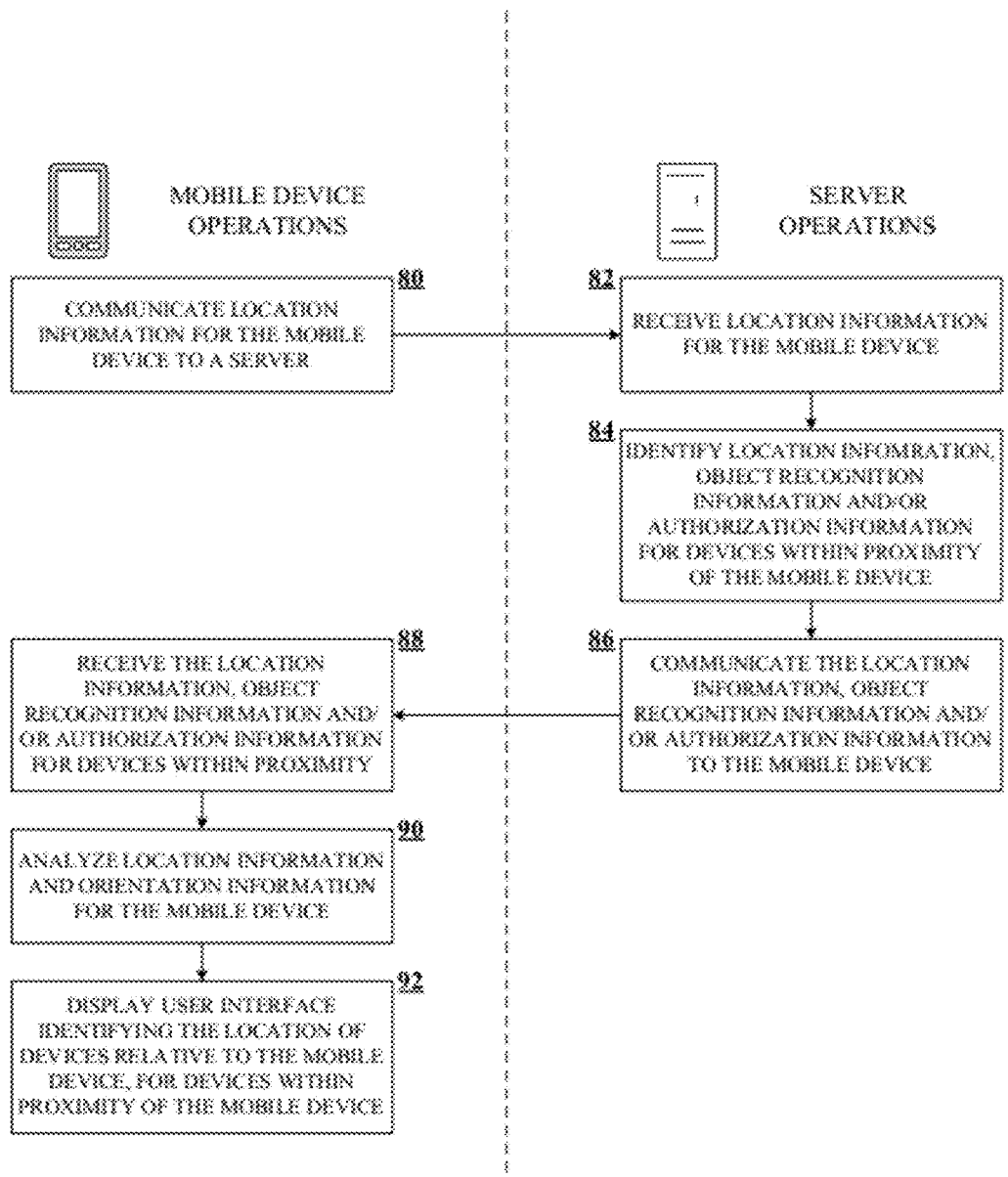
FIG. 8 illustrates a method, according to an embodiment of the invention, for identifying and presenting the location of objects and devices within proximity of a mobile device.

FIG. 8 illustrates a method, according to an embodiment of the invention, for establishing a communication session between a mobile device and another device. The method begins at method operation 80 when a mobile device communicates location information for the mobile device to a server. For example, a mobile device with a GPS receiver may determine its location, and then communicate its location to a server. Alternatively, a sensor (e.g., RFID reader or other presence sensor) in the environment may detect the presence of the mobile device and communicate location information identifying the location at which the mobile device was detected to a server.

At method operation 82 the server receives the location information for the mobile device. Next, at method operation 84, the server identifies location information, object recognition information, and/or authorization information for devices within proximity of the mobile device. For example, based on the location information for the mobile device, the server can first determine if other devices are near the mobile device. For those devices determined to be located near the mobile device, the server can look up in a database or otherwise determine location information for those devices. Additionally, the server identifies object recognition information, which can be used by the mobile device to recognize devices in proximity of the mobile device. In some embodiments, the server identifies authorization information, which indicates whether or not the mobile device, or a user of a mobile device, has been granted the authority to interact with another device. At method operation 86, the location information, object recognition information, and/or authorization information are communicated from the server to the mobile device. The location information and object recognition information and authorization information may be embedded in a three dimensional environment model. Accordingly, the server may simply identify and select the environment model associated with the location of the mobile device, and communicate that environment model to the mobile device.

At method operation 88, the mobile device receives location information, object recognition information and/or authority information for those devices within proximity of the mobile device. Next, at method operation 90, the mobile device analyzes location information and orientation information for the mobile device. For example, based on location information and orientation information received from sensors of the mobile device, the mobile device determines whether or not it is targeting another device in the environment.

At method operation 92, the mobile device displays a user interface that presents a visual indication of the location of devices relative to the location and orientation of the mobile device, as illustrated in the example provided in FIG. 2. In addition, authorization information may be conveyed by the user interface.

Figure 9:
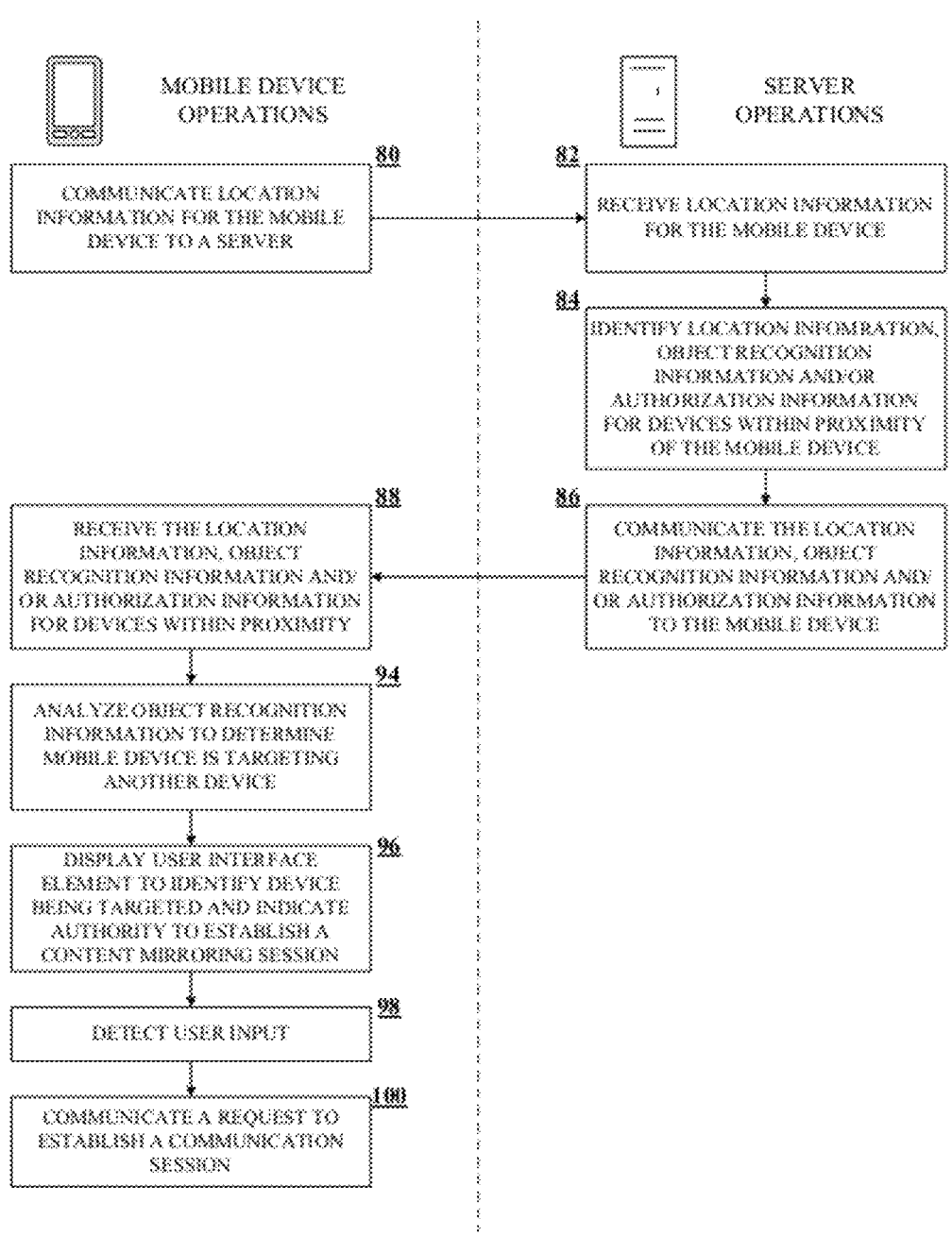
FIG. 9 illustrates a method, according to an embodiment of the invention, for establishing a communication session between a mobile computing device and another device.

FIG. 9 illustrates a method for targeting a device or object, for the purpose of establishing a communication session with that device or object, according to an embodiment of the invention. Method operations 80, 82 84, 86, and 88 are the same for the method of FIG. 9 as they are for the method of FIG. 8. At method operation 90, however, the mobile handset analyzes object recognition information to determine if the mobile device is targeting another device or object. For example, based on a comparison of object recognition information with images captured with an image sensor, the mobile device determines whether or not it is targeting another device in the environment.

At method operation 96, the mobile device displays a user interface element that identifies a device being targeted by the mobile device and indicates that the mobile device has the authority to establish a communication session with the targeted device. At method operation 98, the mobile device detects an input, or series of inputs. In response to detecting the input(s), the mobile device communicates a request to initiate a communication session at method operation 100. This request may be communicated to a server or directly to the targeted device. For example, the request may include a reference to a file, and when the request is received at the targeted device, the targeted device requests the file from its source (e.g., a server). Alternatively, the request may be directed to a server, which, in turn, processes the request and communicates the file to the targeted device.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or logics that operate to perform one or more operations or functions. The modules and logics referred to herein may, in some example embodiments, comprise processor-implemented modules or logics.

Similarly, the methods described herein may be at least partially processor-implemented. For example, at least some of the operations of a method may be performed by one or more processors or processor-implemented modules or logic. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 10:
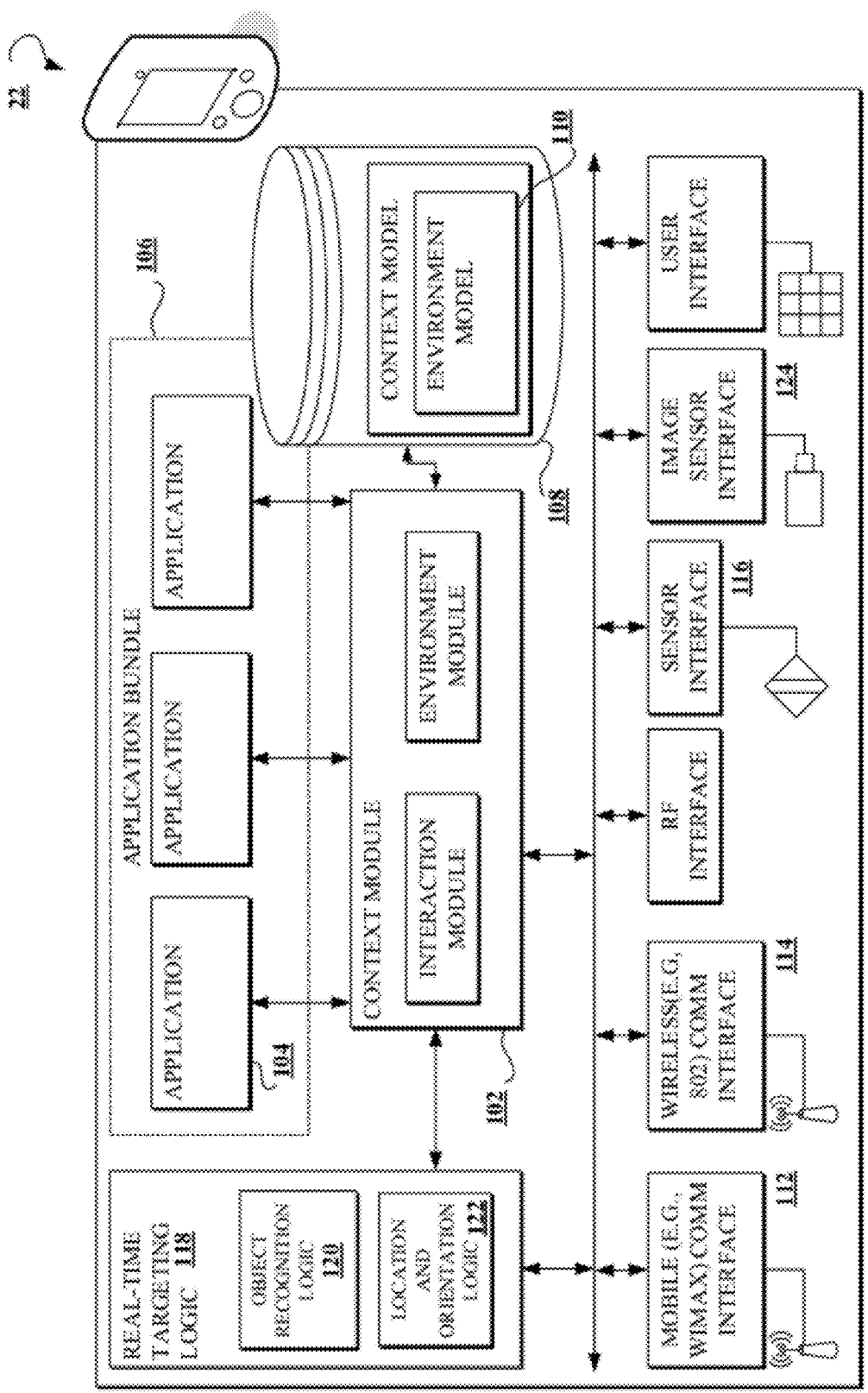
FIG. 10 is a functional block diagram illustrating various logic and functional components included in a mobile computing device, according to an embodiment of the invention, for use in targeting another device for the purpose of establishing a communication session between the devices.

FIG. 10 is a functional block diagram illustrating various functional modules and logics included in a mobile device, according to an embodiment of the invention, for use in targeting another device for the purpose of establishing a communication session. Illustrated is an example mobile handset 22 that includes functionality that enables the mobile handset 22 to interact with other computing devices in general, and establish a communication session in particular. The interactions with other devices may occur in an environment and may represent or comprise a communication session of some type. The various elements illustrated in FIG. 10 may be implemented using hardware, firmware, software, or a combination thereof. Context module 102 includes an interaction module and an environment module. This interaction module may be used to establish a session (e.g., a communication session during which data is exchanged) on behalf of an application 104 in which the mobile device 22 participates. As shown in FIG. 10, there are several applications included in an application bundle, any one of which may establish a communication session. Example applications include FLASH™ of Adobe Systems, Inc., ACROBAT™ of Adobe Systems, Inc., PHOTOSHOP™ of Adobe Systems, Inc., or some other suitable application. Additionally, the context module 102 may include an environment module that is used to generate a request for environment information—including a request for location information, object recognition information, or authorization information—and to process the environment information.

The context module 102 may be connected to a database 108 which may store environment information, such as location information and/or object recognition information for computing devices in a particular physical environment. Such information may be stored in a three dimensional environment model 110. The mobile handset 22 may include various types of communication interfaces 112, 114 to facilitate data communications with other devices generally, and specifically establishing a session, to communicate with other computing devices.

The mobile handset 22 includes at least one sensor interface 116 for receiving information from a sensor. For instance, the sensor interface 116 may receive location information and/or orientation information from a location sensor or an orientation sensor. This location and orientation information is processed by the real-time targeting logic 118 to determine that the mobile device is targeting a computing device, based on location information for the computing device. The real-time targeting logic includes object recognition logic 108 and location and orientation logic 122. The location and orientation logic 122 process location information and orientation information to determine when the mobile handset 22 is targeting another computing device. Similarly, the object recognition logic 120 processes images received from an image sensor interface 124, which is coupled in some embodiments to an image sensor, such as a camera.

Figure 11:
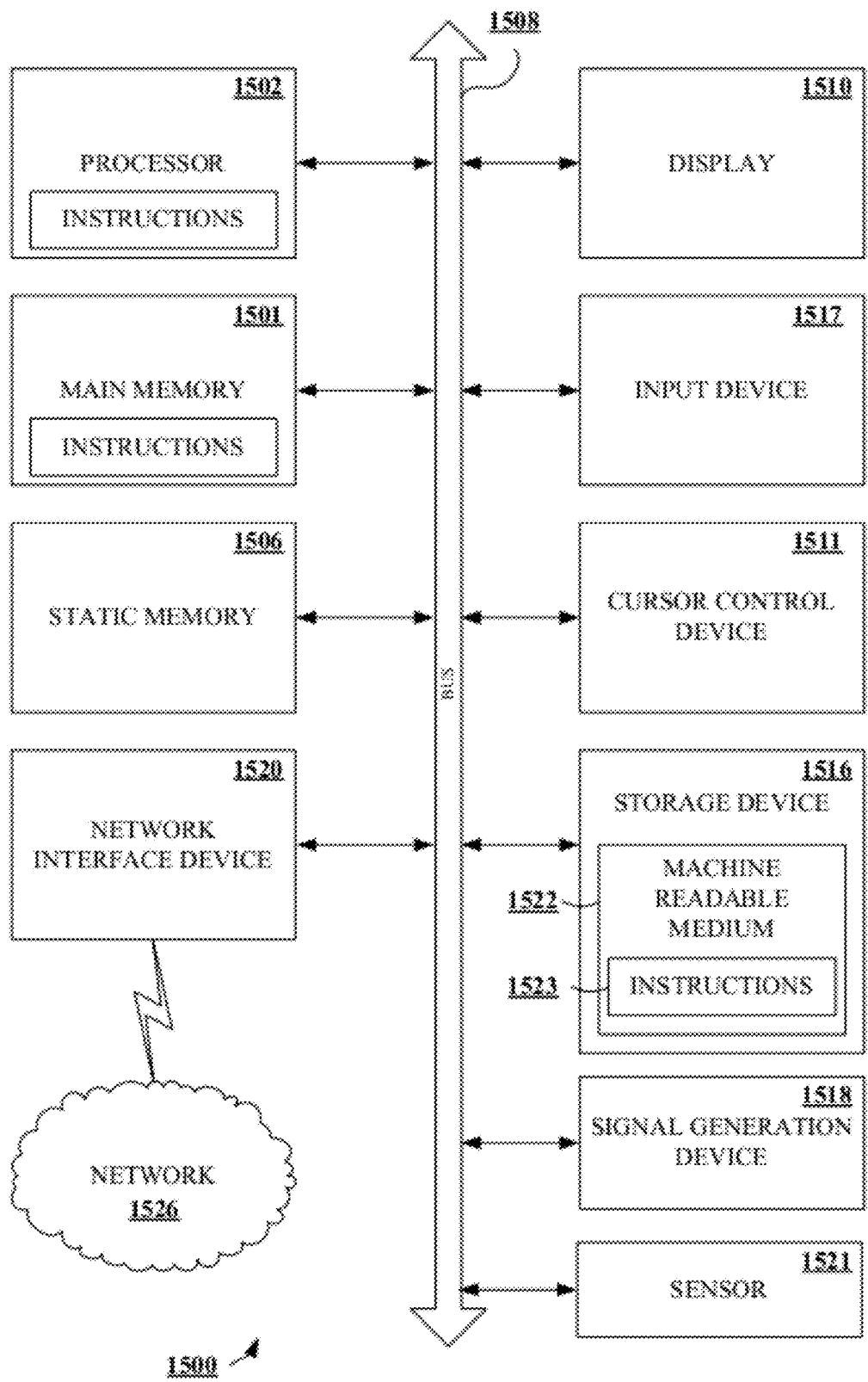
FIG. 11 is a block diagram of a machine in the form of a computing device within which a set of instructions, for causing the machine to perform any one or more of the methodologies discussed herein, may be executed.

FIG. 11 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A processor-implemented method comprising:
communicating location information for a first device to a server;
responsive to communicating the location information for the first device to the server, receiving, at the first device, location information and authorization information for at least a second device, the authorization information for the second device defining whether the first device or its end-user has been granted authority to establish a communication session with the second device;
analyzing the location information for the second device and location information for the first device to determine the location of the second device relative to the location of the first device;
analyzing orientation information for the first device; and
based on the orientation information for the first device in combination with the location of the second device relative to the location of the first device, presenting at the first device a first user interface element indicating a direction of the second device relative to the location and orientation of the first device and providing a visual indicator of whether the first device or its end-user has been granted authority to establish a communication session with the second device.

2. The processor-implemented method of claim 1, wherein the user interface element provides a visual indication of functional capabilities for the second device.

3. The processor-implemented method of claim 1, further comprising:
receiving, at the first device, location information for an object configured to serve as a proxy for a remote device;
analyzing the location information for the object and location information for the first device to determine the location of the object relative to the location of the first device;
analyzing orientation information for the first device; and
based on the orientation information for the first device and the location of the object relative to the location of the first device, presenting at the first device a second user interface element indicating a direction of the object relative to the location and orientation of the first device.

4. The processor-implemented method of claim 3, further comprising:
detecting an input representing a selection of the second user interface element; and
presenting at the first device information associated with the remote device, the information including a current location of the remote device.

5. A mobile computing device comprising:
a display to present a visual indication of a direction of a second device relative to a location and orientation of the mobile computing device;
a wireless communication device to exchange information with other computing devices;
a processor-implemented context module to communicate a request to a server via the wireless communication device, the request specifying location information for the mobile computing device and requesting location information and authorization information for devices in a defined proximity of the mobile computing device;
processor-implemented location logic to analyze location information for the second device and location information for the mobile computing device to determine the location of the second device relative to the location of the mobile computing device;
processor-implemented orientation logic to analyze orientation information for the mobile computing device; and
processor-implemented user interface logic to present at the mobile computing device a first user interface element indicating a direction of the second device relative to the location and orientation of the mobile computing device, the direction determined based on the orientation information for the first device in combination with the location of the second device relative to the location of the first device.

6. The mobile computing device of claim 5, wherein the first user interface element provides a visual indication of authorization information for the second device, the authorization information including a right of the mobile computing device to exchange data with the second device.

7. The mobile computing device of claim 5, wherein the user interface element provides a visual indication of functional capabilities for the second device.

8. The mobile computing device of claim 5, further comprising:
a location sensor to generate location information for the mobile computing device; and
an orientation sensor to generate orientation information for the mobile computing device.

9. A method comprising:
executing instructions on a mobile computing device to communicate location information for the mobile computing device to a server;
executing instructions on a mobile computing device to receive, at the mobile computing device and in response to communicating the location information for the mobile computing device to the server, location information and authorization information for at least one other computing device, the authorization information for the at least one other computing device defining whether the mobile computing device or its end-user has been granted authority to establish a communication session with the one other device;
executing instructions on the mobile computing device to analyze the location information for the at least one other computing device and location information for the mobile computing device to determine the location of the at least one other computing device relative to the location of the mobile computing device;
executing instructions on the mobile computing device to analyze orientation information for the mobile computing device; and
based on the orientation information for the first mobile computing device in combination with the location of the at least one other computing device relative to the location of the mobile computing device, executing instructions on the mobile computing device to present at the mobile computing device a first user interface element indicating a direction of the at least one other computing device relative to the location and orientation of the mobile computing device and providing a visual indicator of whether the mobile computing device or its end-user has been granted authority to establish a communication session with the one other device.

* * * * *